United States Patent

Wang

[11] Patent Number: 5,603,478
[45] Date of Patent: Feb. 18, 1997

[54] KEYBOARD SUPPORT

[76] Inventor: Daniel Wang, 10F, No.15, Sec.2, Chilung Rd., Taipei, Taiwan

[21] Appl. No.: 515,046

[22] Filed: Aug. 14, 1995

[51] Int. Cl.⁶ .................................................. A47G 29/00
[52] U.S. Cl. ........................... 248/371; 248/923; 248/922
[58] Field of Search ................................... 248/371, 396, 248/397, 918, 923, 922, 133, 139

[56] References Cited

U.S. PATENT DOCUMENTS

| 4,533,105 | 8/1985 | Cornwell, Jr. et al. | 248/371 |
| 4,880,191 | 11/1989 | Lake, Jr. | 248/923 |
| 5,398,903 | 3/1995 | Cho | 248/371 |

*Primary Examiner*—Leslie A. Braun
*Assistant Examiner*—Willie Berry, Jr.
*Attorney, Agent, or Firm*—Morton J. Rosenberg; David I. Klein

[57] ABSTRACT

A keyboard support including a base having a concave top surface and a coupling hole at the center of the concave top surface, a locating shaft hooked in the coupling hole and having raised portions around the periphery, a supporting cup mounted on the base around the locating shaft to support a keyboard and having serrated, crossed slots, and a cap fastened to the locating shaft to hold down the supporting cup, wherein the keyboard can be tilted in any of a plurality of different directions by moving the supporting cup in the crossed slots and forcing the serrated periphery of the crossed slots into engagement with the raised portions of the locating shaft.

6 Claims, 10 Drawing Sheets

FIG.9

KEYBOARD SUPPORT

BACKGROUND OF THE INVENTION

The present invention relates to a keyboard support for supporting a keyboard in any of a variety of angular positions.

Various keyboard supports have been developed for supporting a keyboard. These keyboard supports commonly have an adjustment means for adjusting angle of the keyboard supporting surface. However, this adjustment means can only be adjusted to tilt the keyboard in one direction. In case the horizontal direction of the keyboard is to be changed, the whole assembly of the keyboard support must be changed.

SUMMARY OF THE INVENTION

The present invention has been accomplished to provide a keyboard support which can be conveniently adjusted to change the position of the keyboard horizontally and well as vertically.

According to one aspect of the present invention, the keyboard support comprises a base having a concave top surface and a coupling hole at the center of the concave top surface, a locating shaft hooked in the coupling hole and having locating means around the periphery, a supporting cup mounted on the base around the locating shaft to support a keyboard and having serrated, crossed slots, and a cap fastened to the locating shaft to hold down the supporting cup, wherein the supporting cup can be rotated around the locating shaft to change the position of the keyboard horizontally.

According to another aspect of the present invention, the keyboard can be tilted in any of a plurality of different directions by moving the supporting cup in the crossed slots and forcing the serrated periphery of the crossed slots into engagement with the locating means of the locating shaft.

According to still another aspect of the present invention, the locating means of the locating shaft can be raised portions or projecting rods spaced around the periphery of the locating shaft for engagement with the serrated portions of the supporting base.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
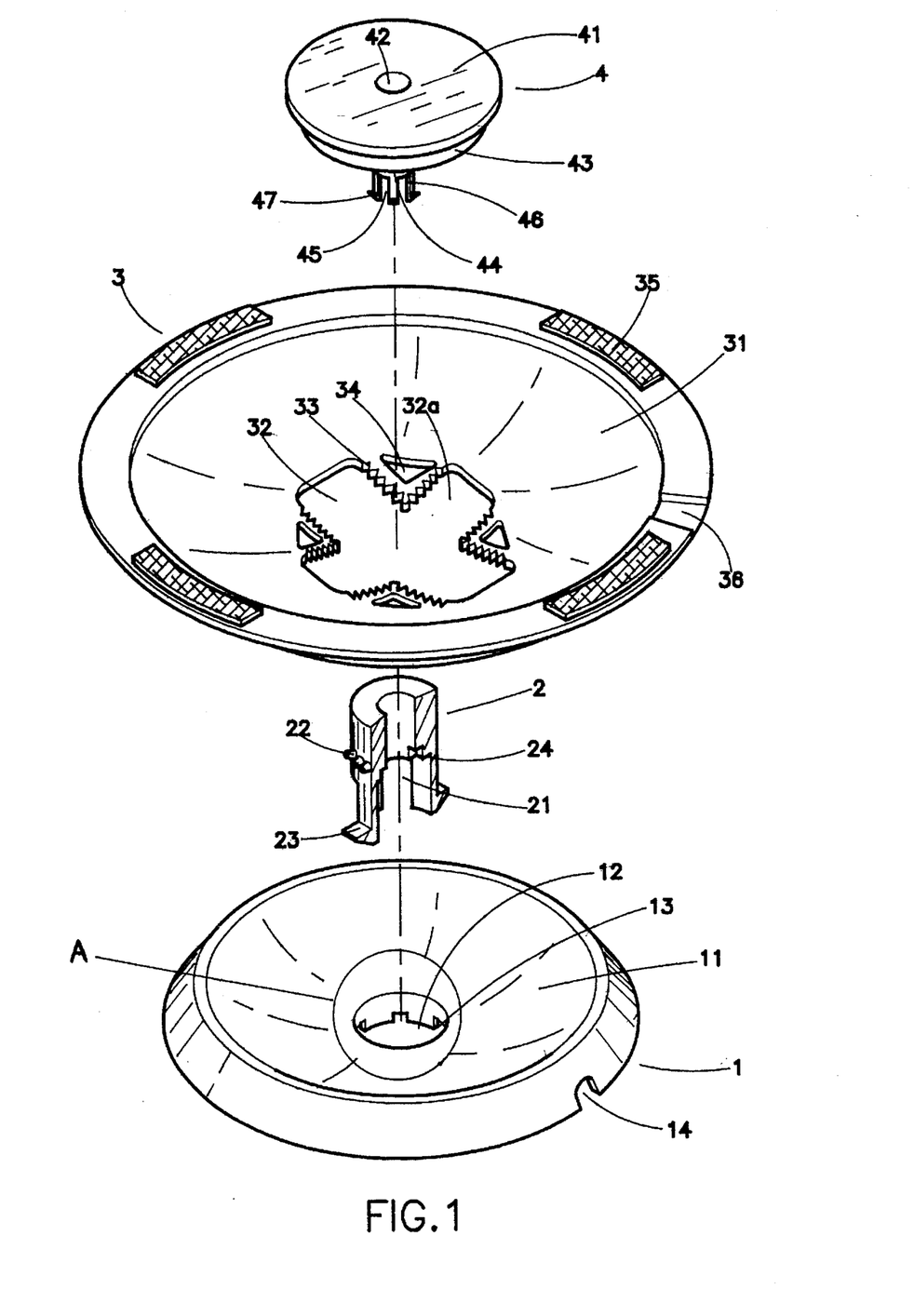
FIG. 1 is an exploded view of a keyboard support according to the present invention.
Figure 1A:
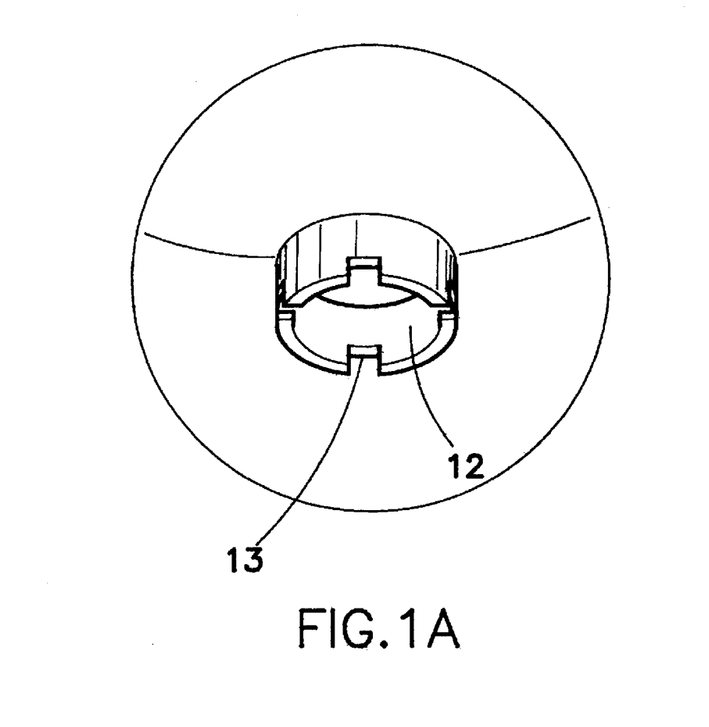
FIG. 1A is an enlarged view of part A of FIG. 1.
Figure 2:
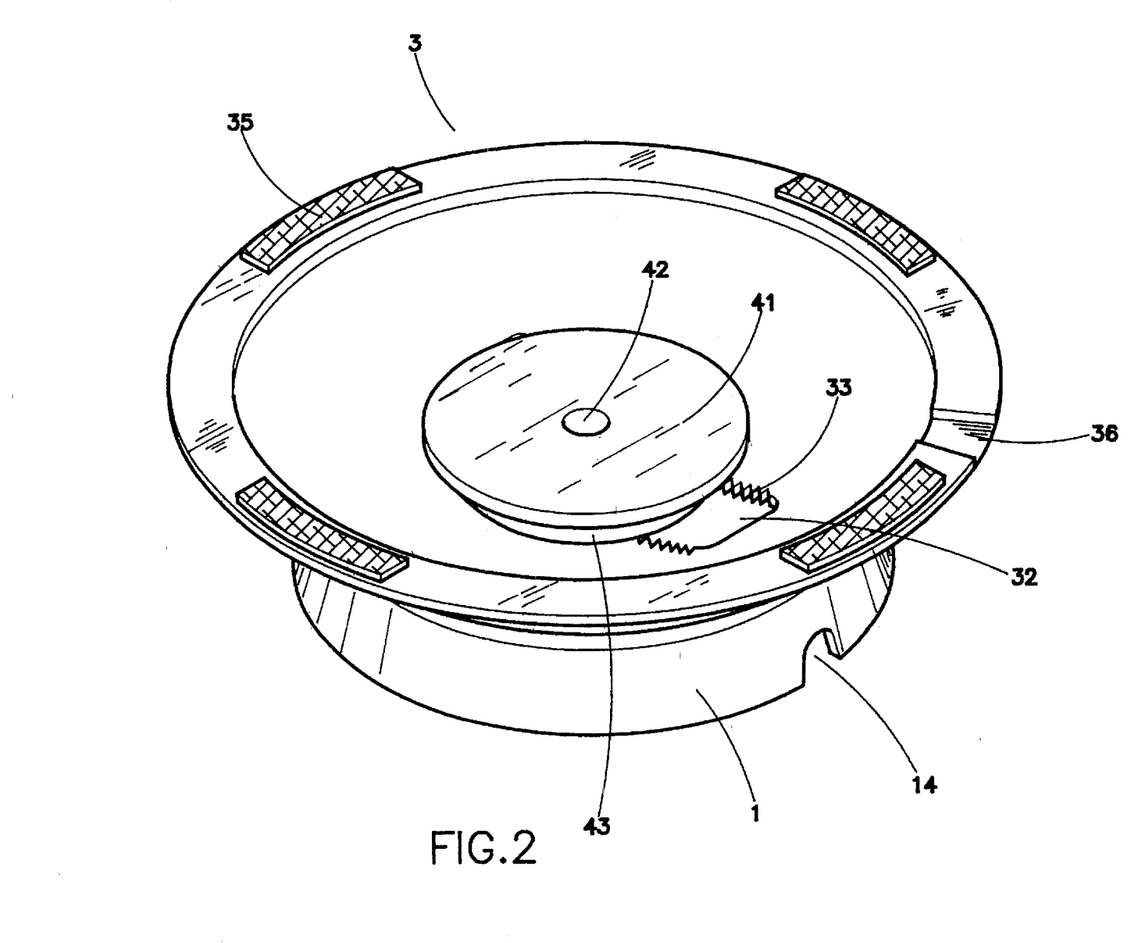
FIG. 2 is an elevational view of the keyboard support shown in FIG. 1.

Referring to FIGS. 1A, 1B, and 2, a keyboard support in accordance with the present invention is generally comprised of a base 1, a locating shaft 2, a supporting cup 3, and a cap 4. The base 1 comprises a concave top surface 11, a coupling hole 12 through the center of the concave top surface 11, a plurality of retaining notches 13 spaced around the periphery of the coupling hole 12, and a wire hole 14 at the border. The locating shaft 2 comprises a stepped axle hole 21 through the longitudinal central axis, a locating groove 24 around the periphery of the stepped axle hole 21, a plurality of raised portions 22 spaced around the outside wall in the middle, and a plurality of downward hooks 23 at the bottom. The supporting cup 3 comprises a bowl-shaped cup body 31, a longitudinal slot 32 and a transverse slot 32a across the center of the bowl-shaped cup body 31, serrated portions 33 symmetrically disposed along the periphery of the slots 32 and 32a, a plurality of openings around the slots 32 and 32a, loop and hook materials 35 at the top side around the concave top surface 31, and a radial wire groove 36 at the border of the bowl-shaped cup body 31. The cap 4 comprises a flat cap body 41, a center through hole 42 through the center of the flat cap body 41, a rounded bottom flange 43 raised from the bottom side of the flat cap body 41, and a split retainer rod 44 downwardly extended from the center of the rounded bottom flange 43. The split retainer rod 44 comprises a plurality of downward springy strips 46 spaced from one another by openings 45 and terminating in a respective hooked portion 47.

Figure 3:
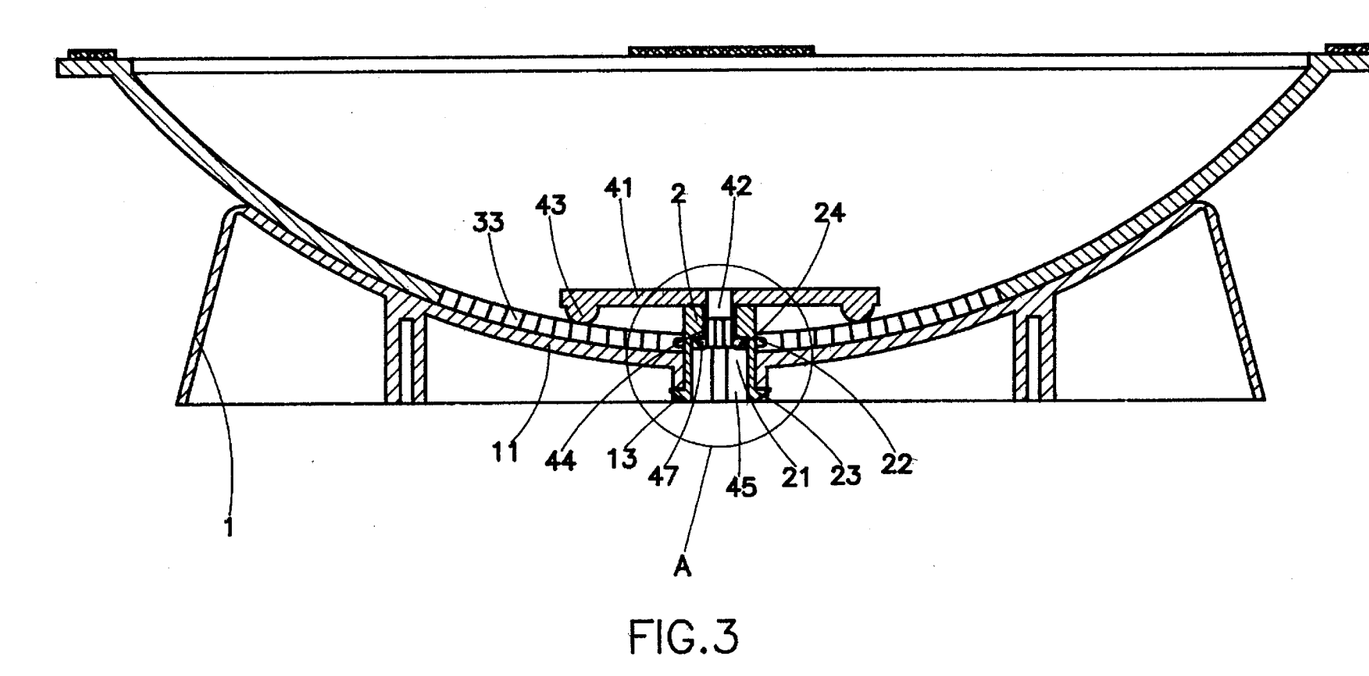
FIG. 3 is a side view in section of FIG. 2.
Figure 3A:
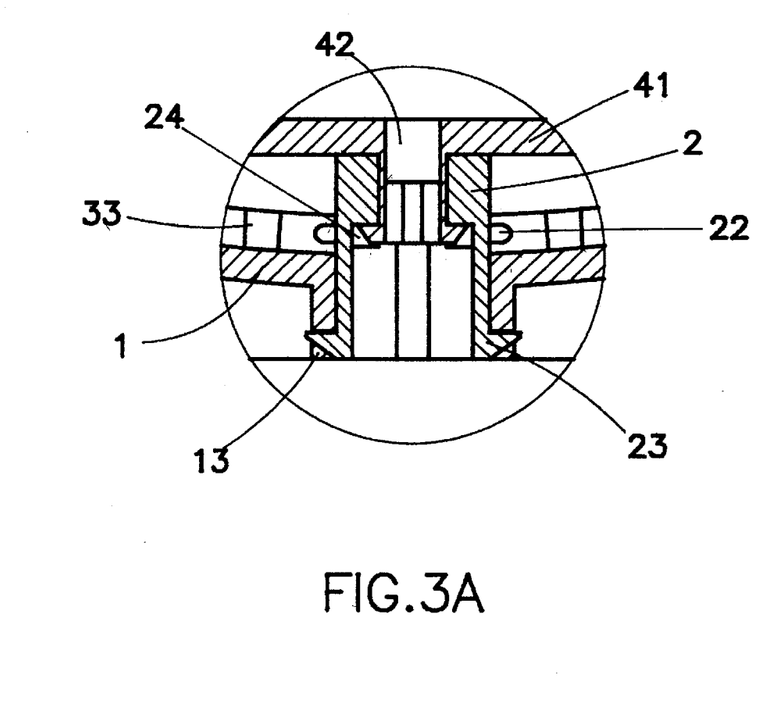
FIG. 3A is an enlarged view of part A of FIG. 3.
Figure 4:
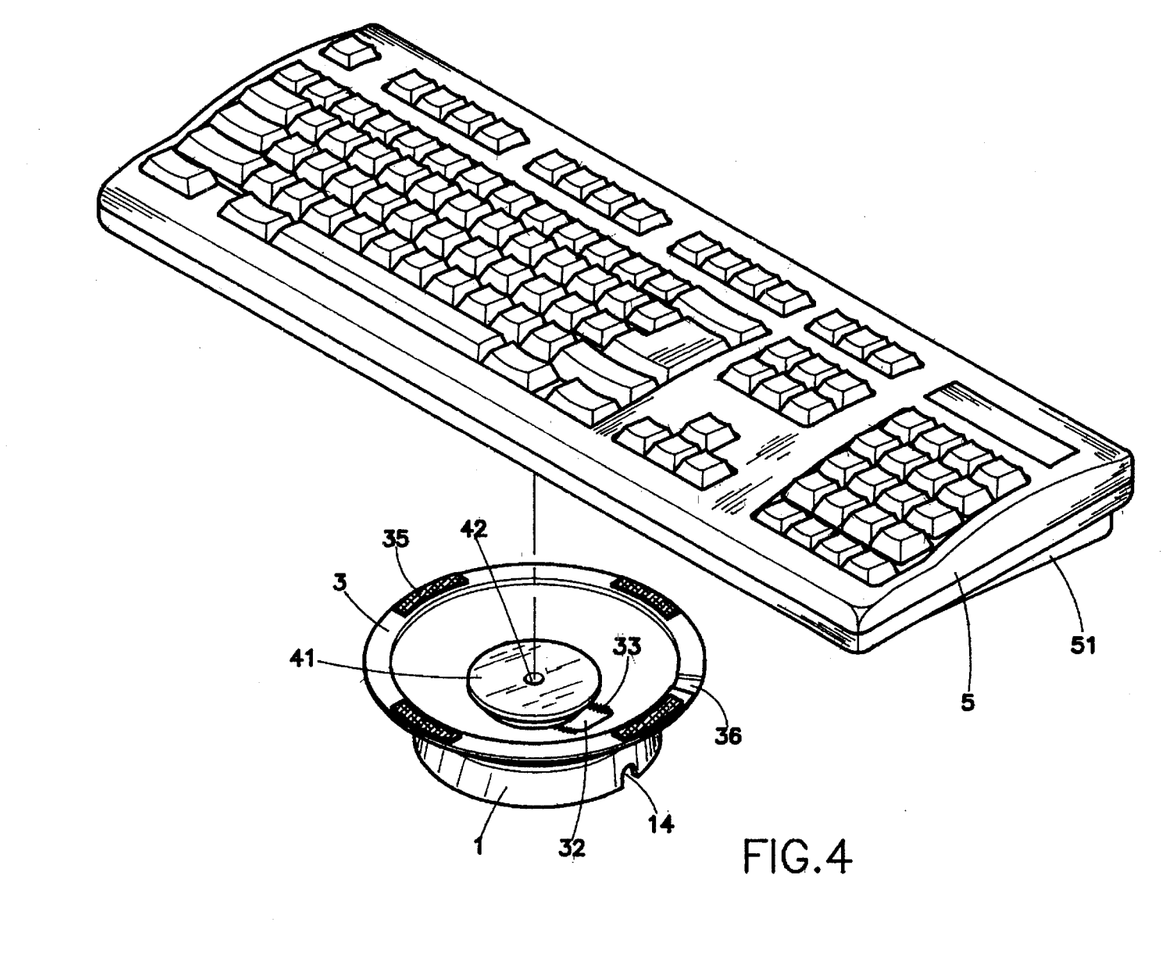
FIG. 4 shows the positioning of the keyboard on the keyboard support according to the present invention.

Referring to FIGS. 3A, 3B, and 4, and FIG. 1A again, the locating shaft 2 is inserted into the coupling hole 12 of the base 1 and fixed in place by hooking the downward hooks 23 on the retaining notches 13 respectively, then the supporting cup 3 is mounted on the base 1, permitting the locating shaft 2 to be extended out of the crossed area of the slots 32 and 32a, then the cap 4 is fastened to the locating shaft 2 to hold down the supporting cup 3 by inserting the retainer rod 44 into the stepped axle hole 21 of the locating shaft 2, permitting the hooked portions 47 of the retainer rod 44 to respectively hooked on the locating groove 24. When assembled, the cap 4 is depressed to force the supporting cup 3 against the base 1, permitting the bowl-shaped cup body 3 to be closely attached to the concave top surface 11 of the base 1. By fastening the loop & hook materials 35 of the supporting cup 3 to respective loop & hook materials (not shown) at the bottom side 51 of the keyboard 5, the keyboard 5 is fastened to the keyboard support. When installed, the cable of the keyboard can be inserted through the radial wire groove 36 of the supporting cup 3, the center through hole 42 of the cap 4, the stepped axle hole 21 of the locating shaft 2, and the coupling hole 12 of the base 1, then extended out of the base 1 through the wire hole 14, and then connected to the computer.

Figure 5:
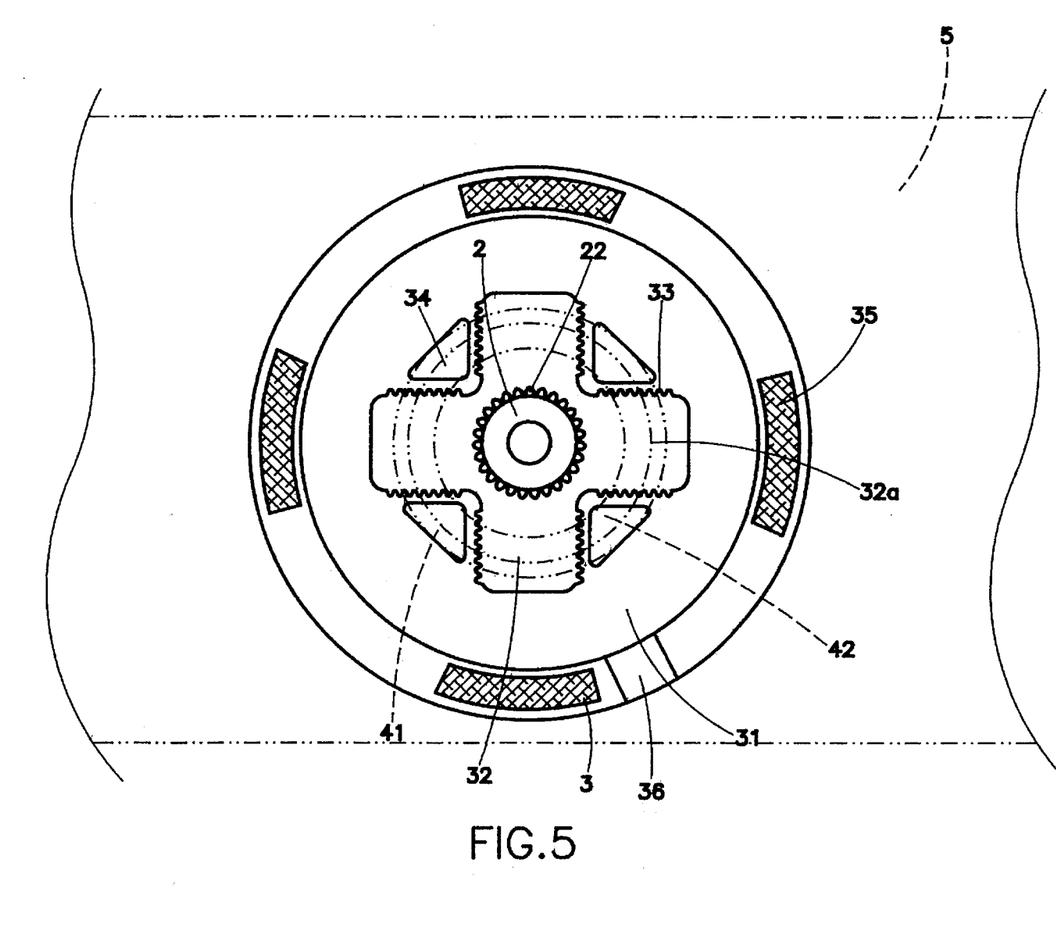
FIG. 5 is a top plain view showing the keyboard installed in the keyboard support according to the present invention.
Figure 6:
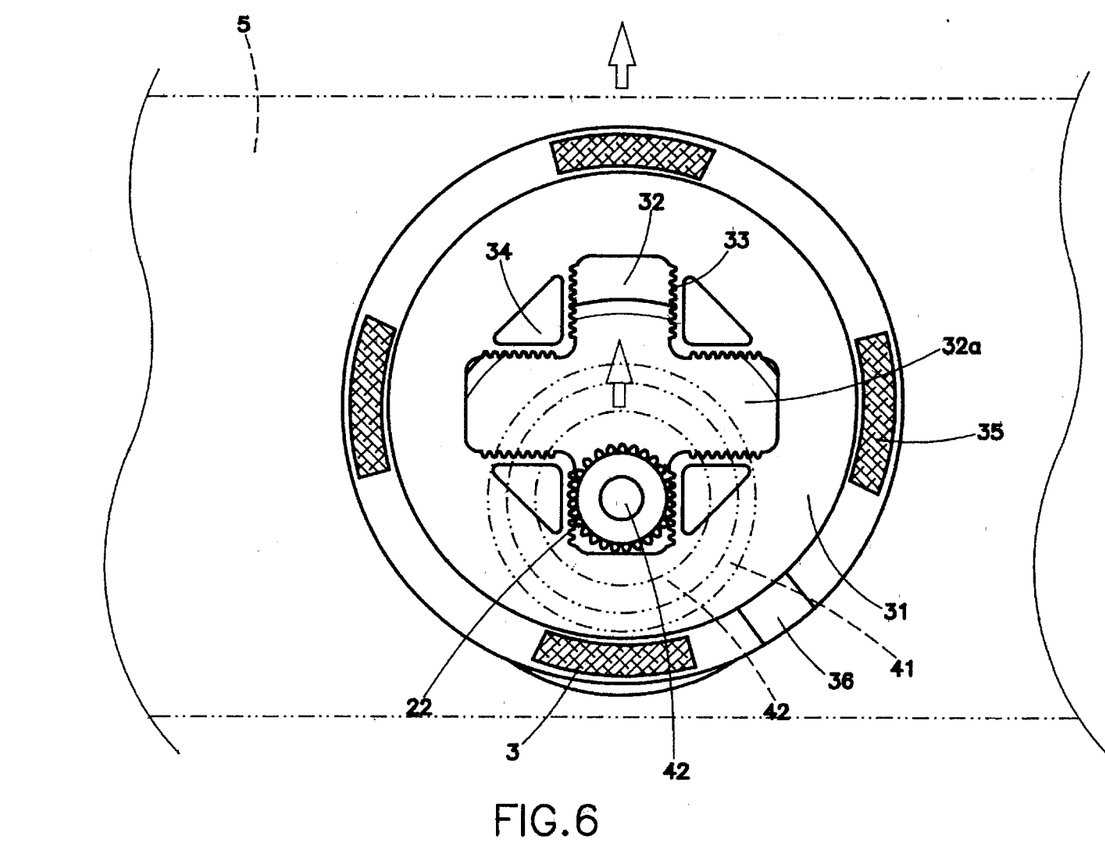
FIG. 6 is similar to FIG. 5 but showing the position of the keyboard adjusted longitudinally.

Referring to FIGS. 5 and 6, when the keyboard support is assembled, the locating shaft 2 is disposed at the crossed area of the slots 32 and 32a, and the supporting cup 3 with the keyboard 5 can be rotated clockwise or counter-clockwise. After rotating the supporting cup 3 to the desired angle, it is forced downward to closely attach the bowl-like cup body 31 to the concave top surface 11 of the base 1.

Referring to FIG. 6, when the keyboard is moved in the longitudinal direction, the raised portions 22 of the locating shaft 2 are forced into engagement with the serrated portions 33 at the longitudinal slot 32 to hold the keyboard in a longitudinally tilted position.

Figure 7:
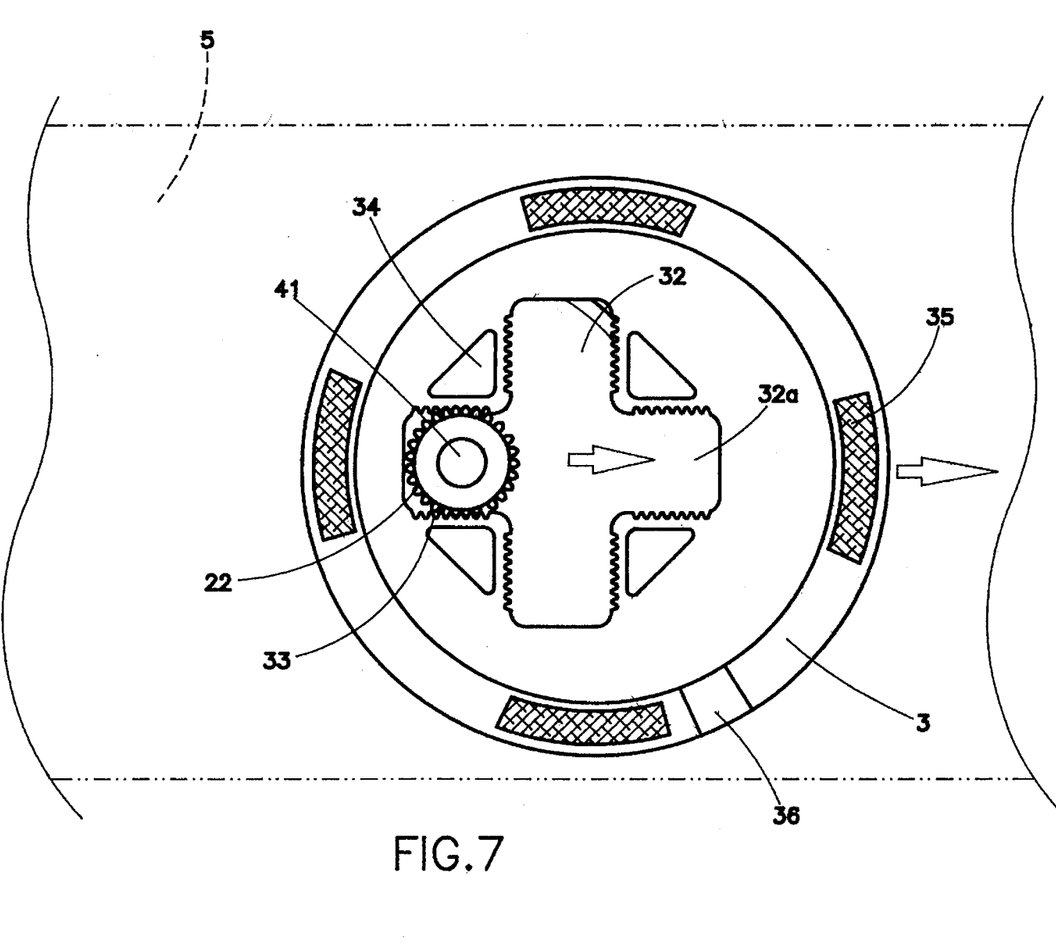
FIG. 7 is similar to FIG. 5 but showing the position of the keyboard adjusted transversely.

Referring to FIG. 7, when the keyboard is moved in the transverse direction, the raised portions 22 of the locating shaft 2 are forced into engagement with the serrated portions 33 at the transverse slot 32a to hold the keyboard in a transversely tilted position.

Figure 8:
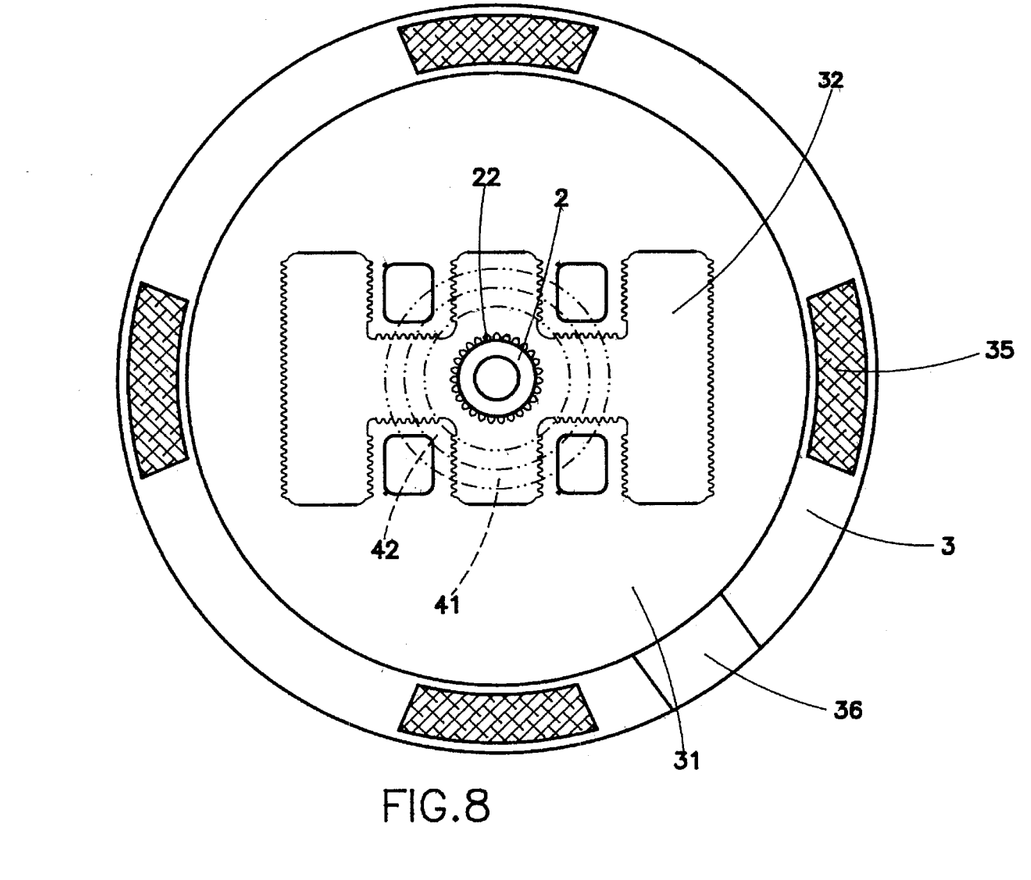
FIG. 8 shows an alternate form of the crossed slots of the supporting cup according to the present invention.

The crossed slots 32 and 32a may be variously shaped so that the keyboard 5 can be retained at any of a variety of angular positions. For example, the longitudinal slot 32 shown in FIG. 8 is made of I-shaped configuration.

Figure 9:
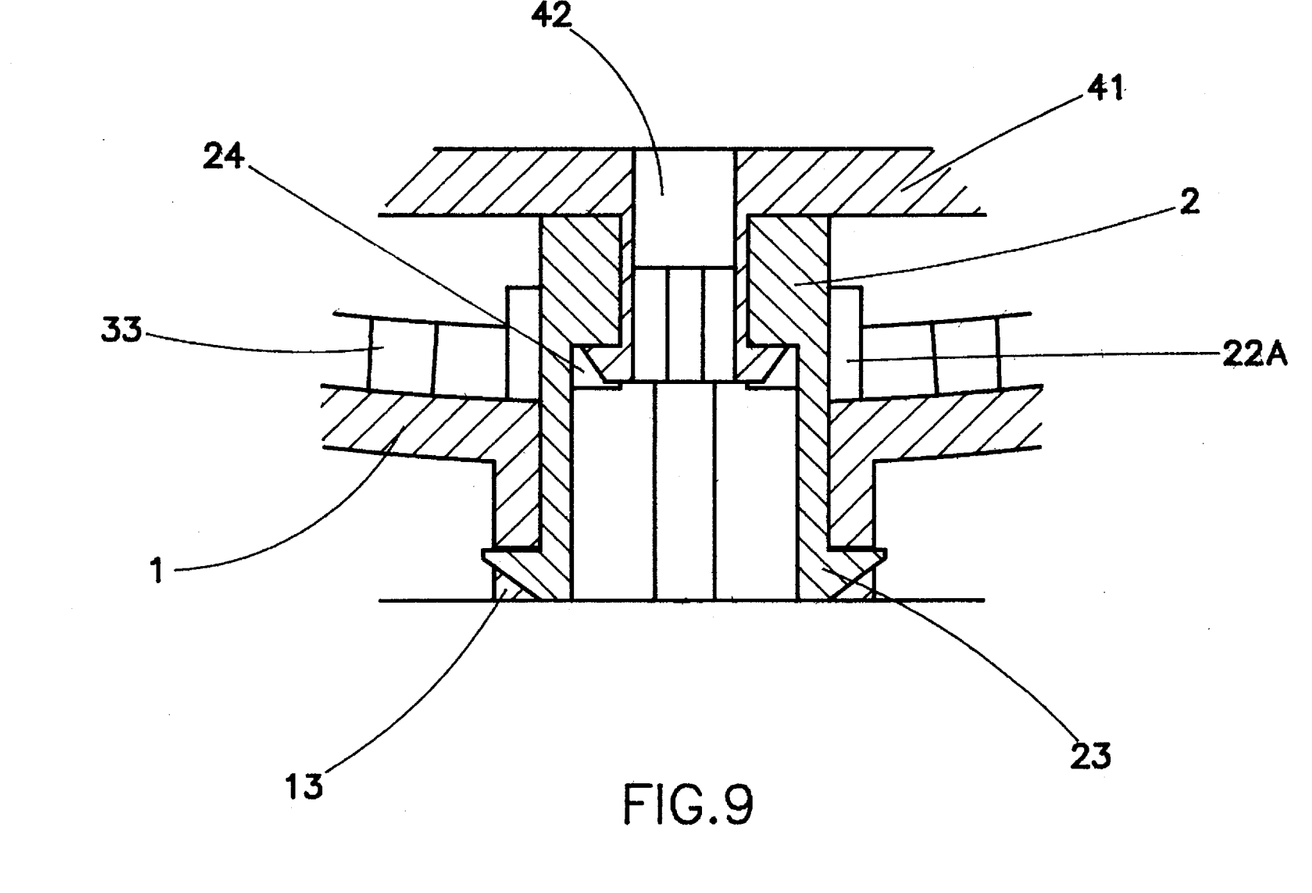
FIG. 9 shows an alternate form of the locating shaft according to the present invention.

FIG. 9 shows an alternate form of the locating shaft 2. According to this alternate form, a plurality of projecting rods 22A are made around the periphery of the locating shaft 2 in the middle to replace the aforesaid raised portions 22.

It is to be understood that the drawings are designed for purposes of illustration only, and are not intended as a definition of the limits and scope of the invention disclosed.

I claim:

1. A keyboard support for supporting a keyboard, comprising:

a base having a concave top surface, a coupling hole through said concave top surface at the center, a plurality of retaining notches spaced around the periphery of said coupling hole, and a wire hole at the border of said base;

a locating shaft fastened to the coupling hole of said base, said locating shaft comprising a stepped axle hole through the longitudinal central axis, a locating groove around the periphery of said stepped axle hole, a locating means spaced around the periphery, and a plurality of downward hooks respectively hooked on the retaining notches of said base;

a supporting cup mounted on said base around said locating shaft to support the keyboard, said supporting cup comprising a bowl-shaped cup body fitting the concave top surface of said base, a longitudinal slot and a transverse slot across the center of said bowl-shaped cup body, a plurality of serrated portions symmetrically disposed along the periphery of said longitudinal slot and said transverse slot for engagement with the locating means of said locating shaft, a plurality of openings around said longitudinal slot and said transverse slot, loop and hook materials at a top side thereof around the border for fastening to respective loop and hook materials on the keyboard, and a radial wire groove at the border for the passing of a cable of the keyboard; and a cap fastened to said locating shaft to retain said supporting cup to said base, said cap comprising a flat cap body, a center through hole through the center of said flat cap body, a rounded bottom flange raised from said flat cap body at a bottom side and fitting the concave cup body of said supporting cup, and a split retainer rod downwardly extended from the center of said rounded bottom flange and inserted into the stepped axle hole and hooked on the locating groove of said locating shaft.

2. The keyboard support of claim 1 wherein the keyboard can be tilted longitudinally by moving said supporting cup into said longitudinal slot and forcing the respective serrated portions into engagement with the locating means of said locating shaft.

3. The keyboard support of claim 1 wherein the keyboard can be tilted transversely by moving said supporting cup into said transverse slot and forcing the respective serrated portions into engagement with the locating means of said locating shaft.

4. The keyboard support of claim 1 wherein said longitudinal slot and said transverse slot each has a plurality of intersected sections.

5. The keyboard support of claim 1 wherein the locating means of said locating shaft comprises a plurality of raised portions spaced around the periphery of said locating shaft for engagement with the serrated portions of said supporting base.

6. The keyboard support of claim 1 wherein the locating means of said locating shaft comprises a plurality of projecting rods spaced around the periphery of said locating shaft for engagement with the serrated portions of said supporting cup.

* * * * *